United States Patent
Waterreus et al.

Patent Number: 5,945,074
Date of Patent: Aug. 31, 1999

[54] APPARATUS FOR INDIRECTLY TRANSFERRING HEAT TO A PROCESS MEDIUM

[75] Inventors: Franciscus Petrus Marie Waterreus, Delft; Jan Frederik Nomden, Zoetermeer; Willem Van Der Plas, Katwijk aan Zee, all of Netherlands

[73] Assignees: Mannesmann Aktiengesellschaft, Düsseldorf, Germany; K.T.I. Group B.V., AB Zoetermeer, Netherlands

[21] Appl. No.: 08/913,749
[22] PCT Filed: Mar. 7, 1996
[86] PCT No.: PCT/DE96/00458
  § 371 Date: Oct. 28, 1997
  § 102(e) Date: Oct. 28, 1997
[87] PCT Pub. No.: WO96/29559
  PCT Pub. Date: Sep. 26, 1996

[30] Foreign Application Priority Data
Mar. 22, 1995 [DE] Germany ............ 195 12 219

[51] Int. Cl.⁶ ............................................. F28D 7/00
[52] U.S. Cl. .............. 422/198; 422/197; 422/196; 422/202; 422/204; 422/209; 422/211; 48/127.3; 48/127.5; 48/127.9
[58] Field of Search ................... 422/197, 198, 422/202, 204, 196, 209, 211; 48/127.3, 127.5, 127.9

[56] References Cited

FOREIGN PATENT DOCUMENTS
2194927 3/1974 France.
919657 11/1954 Germany.

*Primary Examiner*—Walter D. Griffin
*Assistant Examiner*—Tung Doan
*Attorney, Agent, or Firm*—Cohen, Pontani, Lieberman & Pavane

[57] ABSTRACT

The invention relates to an arrangement for indirectly transferring heat to a flowing process medium, in particular for carrying out hydrocarbon steam reformation. The arrangement comprises a heating chamber (1), which can be heated from above by burners (2) arranged in a plurality of rows and through which run, on vertical longitudinal planes, a plurality of rows of heat exchanger tubes (3) through which the process medium flows. The combustion waste gases of the burners (2) [are extracted through] waste gas ducts (4), which are made of refractory-grade material and arranged on the bottom of the heating chamber (1) parallel to one another and to the rows of the heat exchanger tubes (3) and have a substantially rectangular cross-section that is constant in the axial direction. For the passage of waste gases from the heating chamber (1) into the interior of the waste gas ducts (4), each waste gas duct (4) has openings (5) distributed on its longitudinal sides in the area near the bottom over its entire axial length. According to the invention, to equalize the waste gas flow conditions, flow bodies are disposed inside the waste gas ducts (4) in the region of the lower part of the rows of the heat exchanger tubes (3).

6 Claims, 7 Drawing Sheets

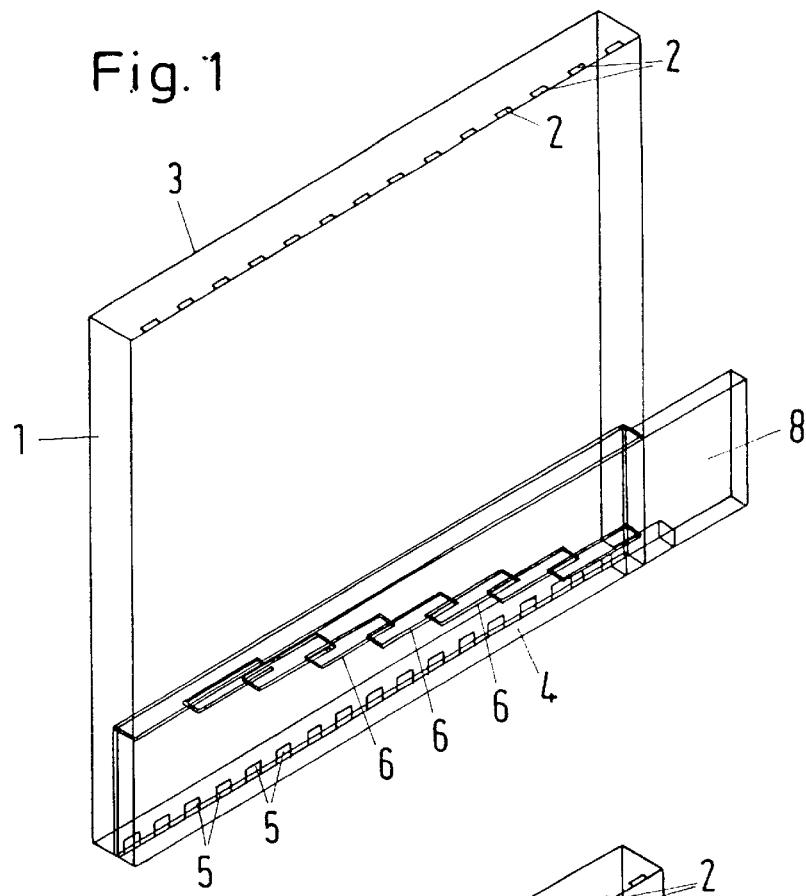
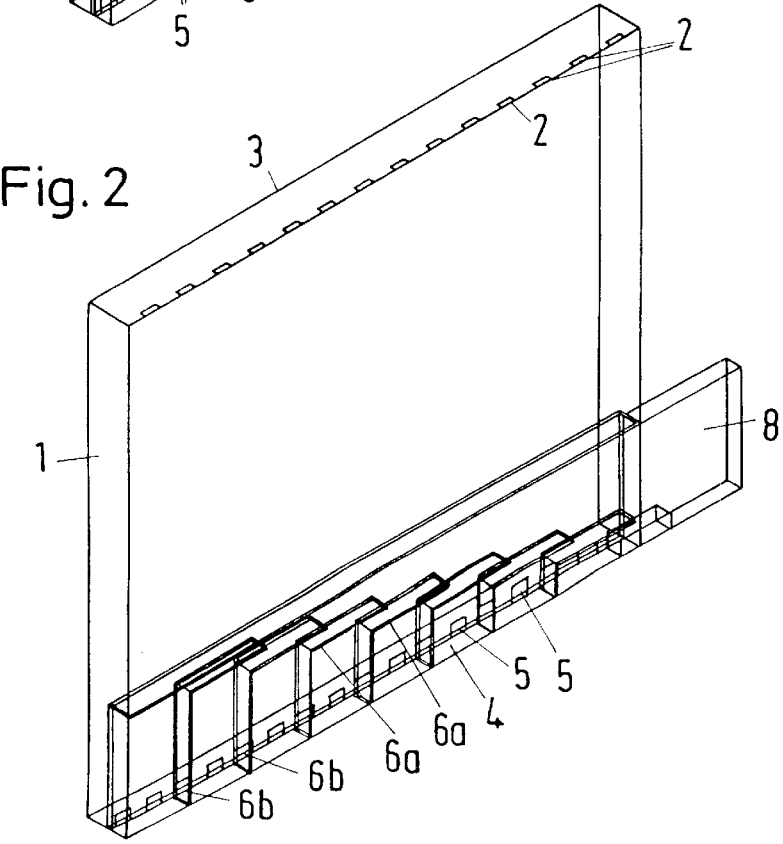

PRIOR ART

PRIOR ART

PRIOR ART

APPARATUS FOR INDIRECTLY TRANSFERRING HEAT TO A PROCESS MEDIUM

FIELD OF THE INVENTION

The invention relates to an apparatus for indirectly transferring heat to a process medium, especially for carrying out hydrocarbon steam.

BACKGROUND OF THE INVENTION

German Publication DE-PS 919 657 discloses a device for deflecting asses through long ducts. In this device, uniform distribution of the gas through exit ports in the side walls of the long ducts is realized through the mounting of blades, but in a hook-like fashion, such that the blades extend into the duct at a right angle to the flow direction.

From DE-PS 919 657, a device for deflecting gasses that flow through long ducts is known. This device serves for uniform distribution to exit openings in the side walls of the ducts and comprises blades bent in a hook-like fashion, which extend into the duct at a right angle to the flow direction.

For hydrocarbon steam reformation, apparatus like the example shown in FIGS. 5 to 7, in different views and partial section, are often used. The prior art apparatus of FIGS. 5–7 has a substantially cuboid-shaped heating chamber 1, which is heated by a plurality of burners 2. The burners 2 are arranged proximate an upper surface of the heating chamber in rows in the roof of the cuboid, and their flame is directed vertically upward. Heat exchanger tubes 3 are arranged between the rows of burners on a vertical plane. A process medium for an endothermic chemical reaction can be run through these heat exchanger tubes 3. The process medium is heated primarily by the radiant heat produced during combustion, but partially by convection as well. To extract the combustion gasses from the heating chamber 1, waste gas ducts 4 are arranged on the bottom of the heating chamber 1. The waste gas ducts 4, are closed on top. The waste gas ducts 4 are arranged parallel to the rows of heat exchanger tubes 3 and the rows of burners and have a substantially rectangular cross-section. The waste gas ducts 4 are made of a refractory-grade material (e.g., built of refractory-grade bricks). Numerous openings 5 are distributed along the axial length of the waste gas ducts 4 in the lower part of their side walls. Through these openings 5, the waste gas can make its way from the heating chamber 1 into the interior of the waste gas ducts 4. The waste gas then flows through the waste gas ducts 4 laterally out of the heating chamber 1 and enters a collection ducts, into which all waste ducts 4 open. The waste gas is fed through the collection duct to a means for using the residual heat still contained in the waste gas, and finally discharged into the open air.

In the practical operation of the prior art apparatus, it has been found that heat transfer to the heat exchanger tubes is not uniform. This is reflected by the evidence found during the maintenance of such prior art apparatus. If some of the heat exchanger tubes are exposed to greater heat, these tubes age more rapidly and must be replaced sooner. In this situation, the choice is between either replacing all of the heat exchanger tubes, including those that do not yet need to be replaced, or exchanging only some of the tubes. The latter choice results in more frequent interruptions of operation for maintenance and repair and the former is more expensive in that some of the heat exchanger tubes are replaced before the end of their useful life.

Because the heat exchanger tubes are heated largely by radiant heat, it is very important that the tubes be exposed to the same conditions with respect to the effects of the heat radiation source. When the waste gas ducts have a rectangular cross-section, this happens as a matter of principle. FIG. 8, which shows a sliced section through a heating chamber 1, schematically illustrates such a rectangular duct in greater detail. The openings 5 in the side walls of the waste gas duct 4 for the passage of waste gasses are arranged along a bottom of waste gas duct 4. Another known form for a waste gas duct 4a is shown in FIG. 9. This waste gas duct 4a also has a rectangular cross-section, but its cross-section changes continuously in the direction of the waste gas discharge (collection duct 8). The step-like roof of the waste gas duct 4a is inclined in such a way that the cross-section continuously grows larger in the direction of the collection duct 8. This design of the waste gas duct 4a is intended to ensure that waste gas is extracted uniformly over the axial length of the waste gas duct. This does not happen in the case of the cuboid-shaped waste gas duct 4 in FIG. 8, due to pressure loss. However, the shape of the waste gas duct 4a provides no effective improvements in this respect. In both cases, therefore, uneven heating of the heat exchanger tubes occurs. If it were possible to ensure uniform distribution during the transfer of heat to the heat exchanger tubes, then the heat exchanger tubes could be designed with thinner walls, because the higher wall temperatures that occur in some tubes when there is uneven heat distribution would no longer have to be taken into account. Accordingly, more extreme operating conditions could then be applied or the useful life of the heat exchanger tubes could be extended during normal operation.

OBJECT OF THE INVENTION

The object of the invention is to further develop an apparatus for indirectly transferring heat to a process medium that the most uniform possible distribution of heat during the transfer of heat to the process medium in heat exchanger tubes is ensured.

BRIEF DESCRIPTION OF THE DRAWINGS

In the drawings, wherein like reference numerals denote similar elements throughout the several views:

FIG. 1 shows a sliced section through a heating chamber with a waste gas duct according to an embodiment the present invention;

FIG. 2 shows a sliced section of another embodiment of the heating chamber of FIG. 1;

DETAILED DESCRIPTION OF THE PRESENTLY PREFERRED EMBODIMENTS

Figure 5:
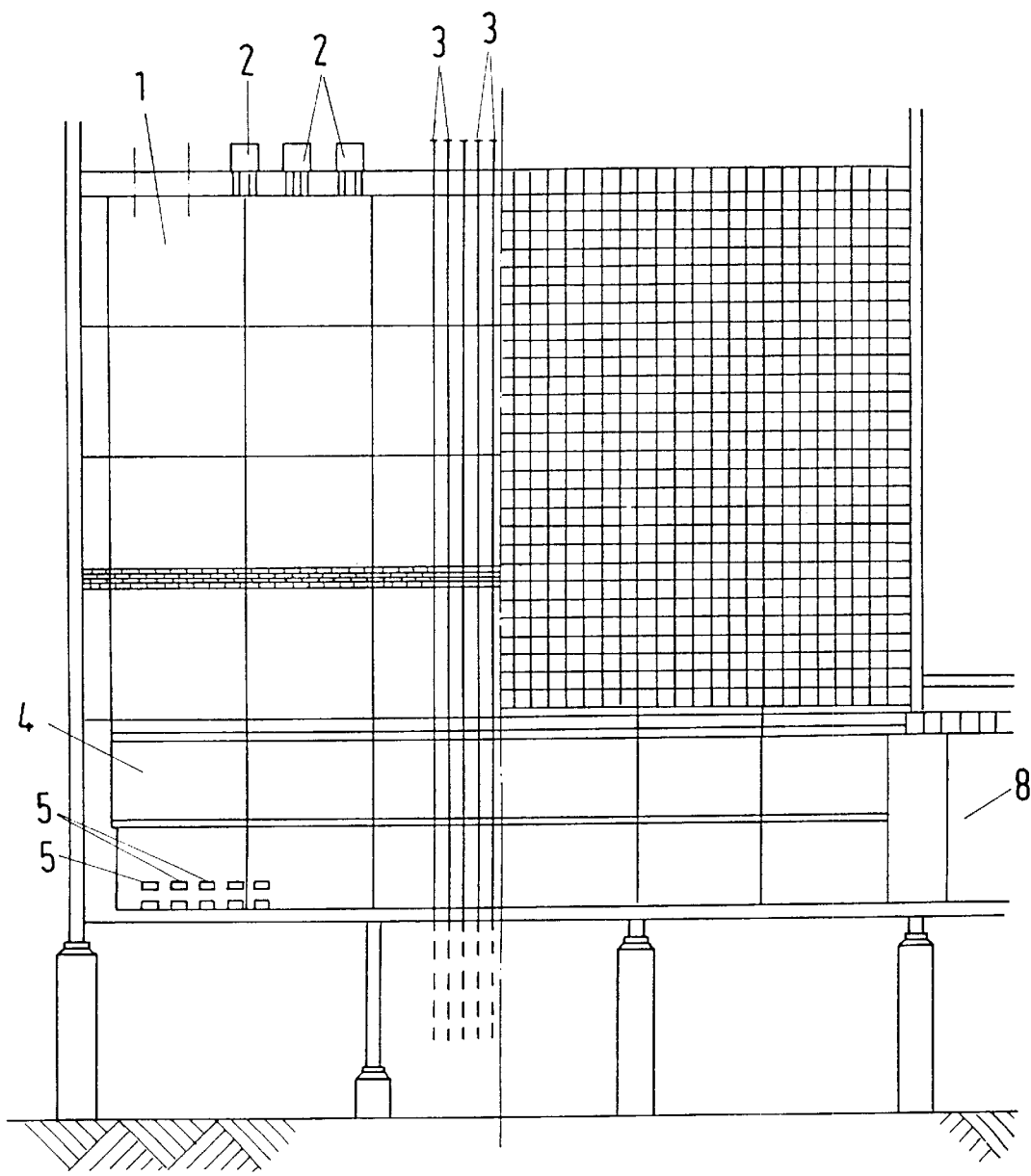
FIG. 5 is a side view of a prior art steam reformation apparatus.
Figure 6:
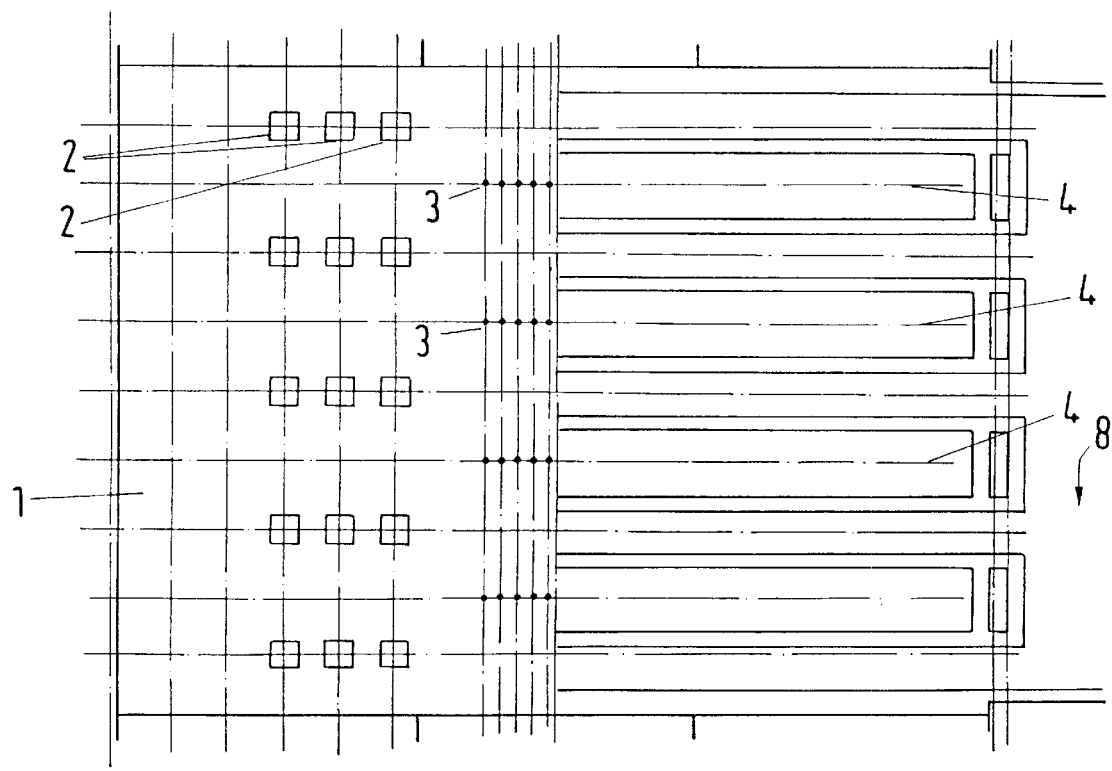
FIG. 6 is a top plan view of the prior art apparatus of FIG. 5.
Figure 7:
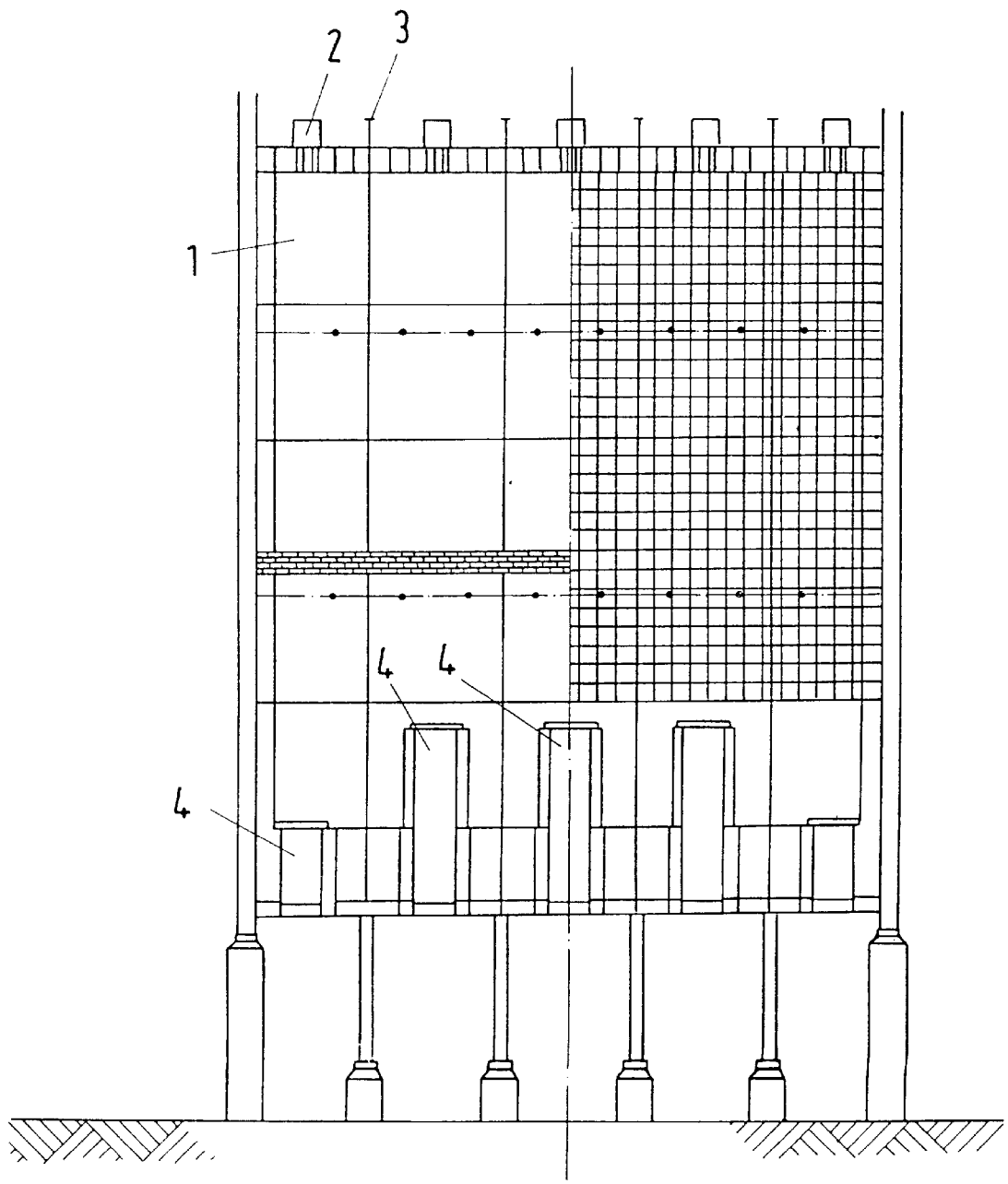
FIG. 7 is a front view of the prior art apparatus of FIG. 5.

The object of the invention is attained with surprisingly simple means. An especially simple embodiment of the invention is shown schematically in FIG. 1 in the form of a sliced through a heating chamber along a waste gas duct 4. A series of flow bodies in the form of flow baffles 6 is simply arranged in the interior of the waste gas duct 4. The flow baffles 6 are flat bodies running substantially horizontally in the axial direction (flow direction) of the waste gas duct 4 and having thinner walls compared with the duct cross-section. The flow baffles 6 extend across the entire width of the waste gas duct 4 between its longitudinal walls. The flow baffles 6 are made of a heat-resistant material suitable for the conditions of use, such as a refractory-grade material or a heat-resistant metal material; thus, the term "flow baffle" does not necessarily refer to metal materials only. Rather, the term is meant to indicate the fact that the waste gas flow inside of the waste gas duct 4 is influenced in the sense of being evened out in the axial direction. The length of each flow baffle 6 equals only a small fraction of the total axial length of the waste gas duct 4. The individual flow baffles 6 are arranged, as a whole, in a step-like fashion, with the steps leading downward in the direction of the collection duct 8. Advantageously, the individual directly adjacent flow baffles 6 overlap each other partially. The waste gas flows through the waste gas openings 5 arranged as in FIG. 5, i.e., located close to the floor of the heating chamber 1, and reaches the interior of the waste gas duct 4. There, the waste gas flows upward and is deflected horizontally by the flow baffles 6 located in the area of each opening. In this way, a horizontal flow in the direction of the collection duct 8 is produced quite uniformly over the entire cross-section in the interior of the waste gas duct 4.

FIG. 2 shows a modification of the embodiment in FIG. 1. The embodiment in FIG. 2 differs only in that the individual flow baffles 6a are each connected, on their face sides that face away from the collection duct 8, to a somewhat vertical dividing baffle 6b. The dividing baffle 6b extends down to the floor of the waste gas duct 4. As a result, a forced orientation of the waste gas flow is achieved from the start, because the waste gas that flows in between two directly adjacent dividing baffles 6b is completely enclosed by the wall of the waste gas duct 4 and these two dividing baffles 6b. The waste gas can then flow only through the axial opening located between the two flow baffles 6a associated with the two dividing walls 6b, i.e., the waste gas must necessarily assume a horizontal flow. However, the embodiment in FIG. 2 provides no significant improvements compared to that in FIG. 1.

Figure 8:
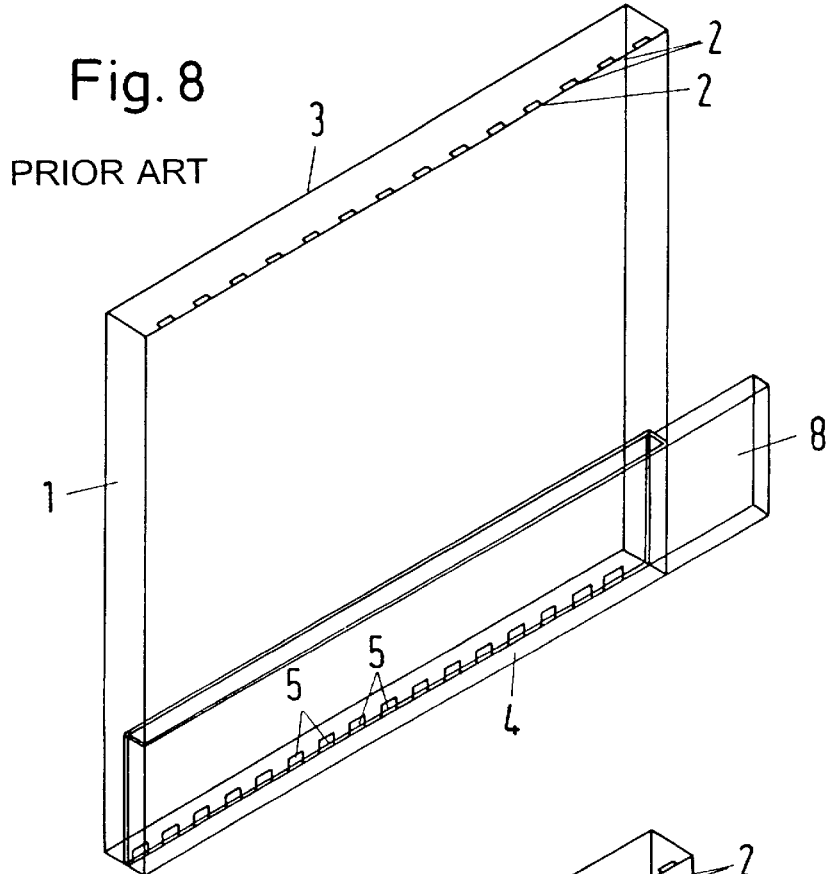
FIG. 8 is a schematic sliced section through the prior art device of FIG. 5 with a cuboid-shaped gas duct.
Figure 9:
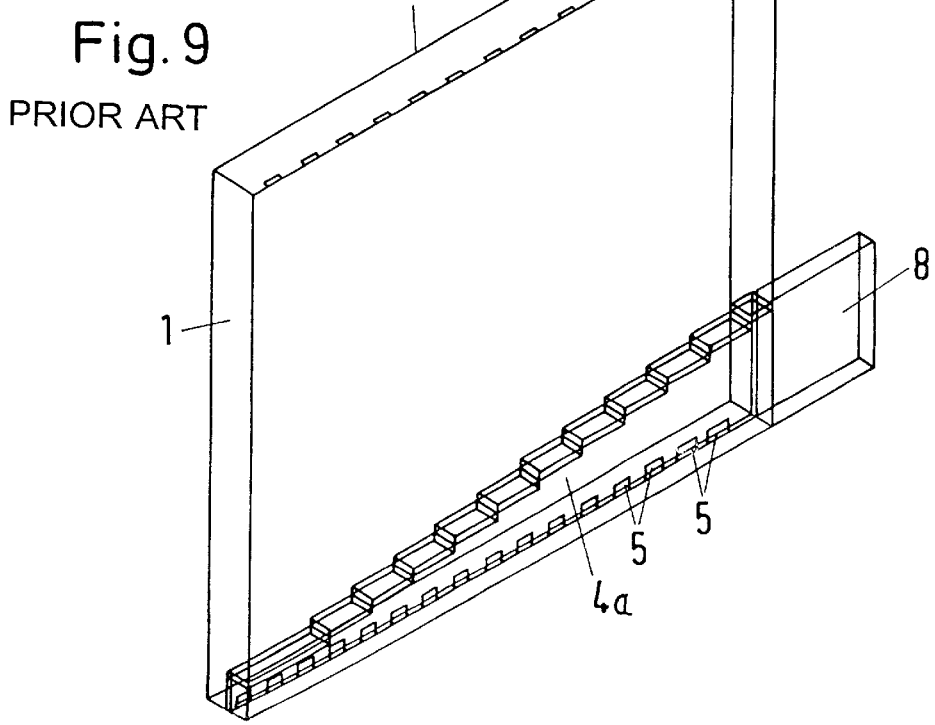
FIG. 9 is a sliced section through the prior art device of FIG. 5 with an inclined waste gas duct.

The invention eliminates the uneven flow of waste gas from the interior of the heating chamber 1 previously found in an embodiment of the waste gas duct 4 as in FIG. 8 (or a waste gas duct 4a as in FIG. 9). The pressure losses that occur in the waste gas duct 4 or 4a resulted in the previous design in a clearly stronger waste gas flow in the part of the heating chamber 1 closer to the collection duct 8. In the regions farther from the collection duct 8, the waste gas flow was markedly weaker, so that non-uniformities developed in heat distribution.

Figure 3:
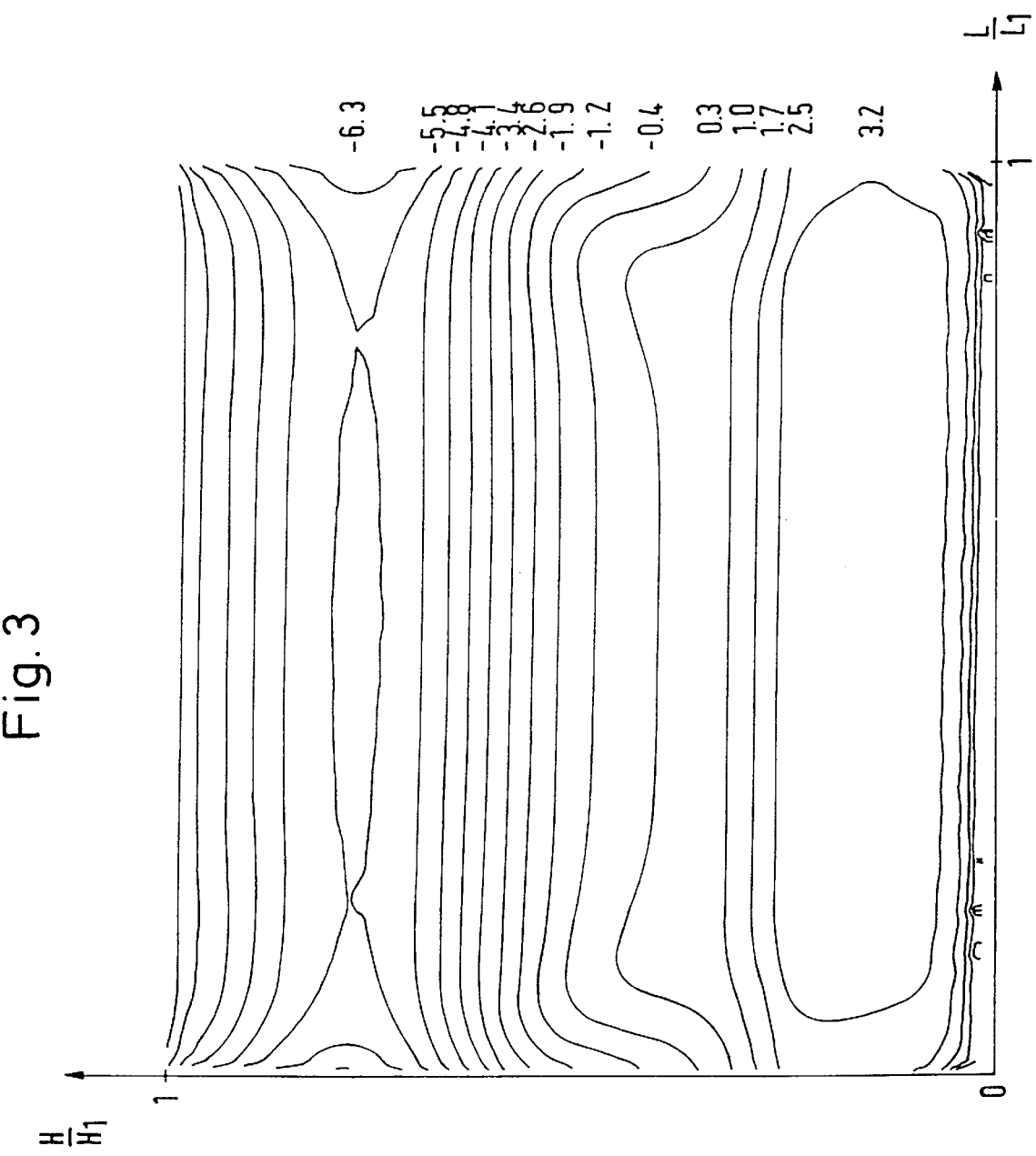
FIG. 3 depicts a profile of the vertical components of the waste gas rate in the vicinity of a row of heat exchanger tubes along a waste gas duct according to the present invention.

The effectiveness of the inventive measure of installing flow bodies in the waste gas duct can be seen by analyzing the waste gas flow in the flow profile shown in FIG. 3. This drawing (in which parameter values are recorded) shows the vertical components of the waste gas flow rate in the immediate vicinity of a heat exchanger tube row 3 in a cross-section parallel to the plane of the heat exchanger tube row 3. Lines of equal flow rate as a function of the location L along the length L1 of the waste gas duct and of the height H from the floor of the heating chamber (total height H1) have been recorded.

The negative flow rate values indicate that in the immediate vicinity of the heat exchanger tubes in the upper half of the heating chamber, the combustion waste gas flows from bottom to top, because roller-like flows form between two rows of heat exchanger tubes and are directed downward in the middle (in the area of a burner plane). Not until the lower half of the heating chamber does the combustion waste gas flow downward along the heat exchanger tubes to the openings in the side wall of particular waste gas duct. Clearly, only slight differences in the vertical components of the flow rate occur along in the direction of the waste gas duct at a constant height above the floor of the heating chamber, which is a measure of the intensity of the heat transfer taking place by means of convection.

Figure 4:
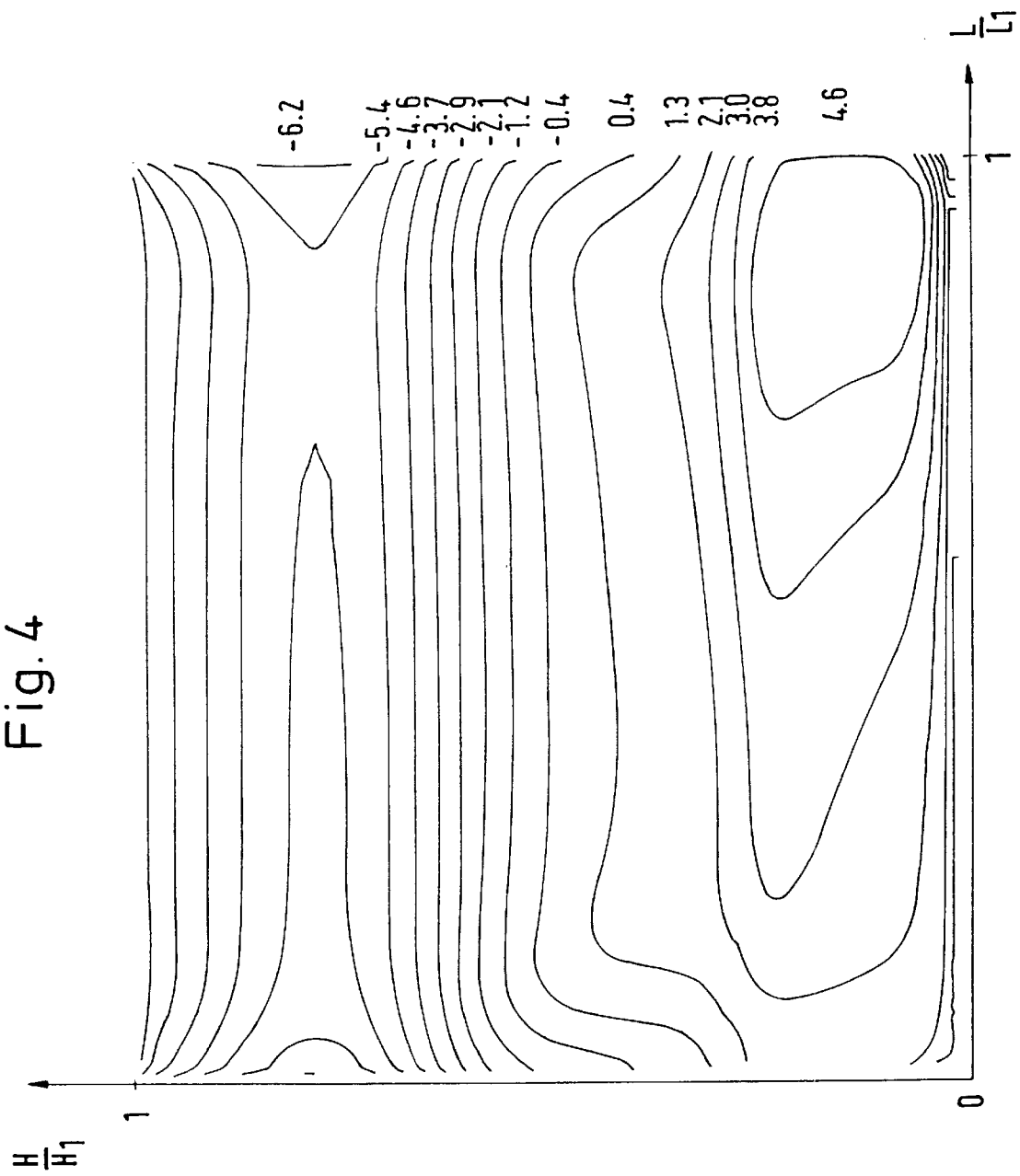
FIG. 4 depicts a comparative profile like that shown in FIG. 3 for an apparatus using a prior art waste gas duct.

In contrast, as FIG. 4 (reflecting a corresponding analysis) shows, the differences in the vertical components along the direction of the waste gas duct are marked in a heating chamber with a prior art gas duct embodied as in FIG. 8. The lower right part of this drawing shows the area with the most positive (i.e., downwardly directed) vertical speed components by far. This means that the strongest mass flow of the combustion waste gas in the heating chamber cross-section is present in the immediate vicinity of the waste gas duct output from the heating chamber. This in turn must mean that considerably greater heating of the heat exchanger tubes takes place in this area than in the other regions, due to the intensive convection.

We claim:

1. An apparatus for indirectly transferring heat to a flowing process medium, comprising:
    a heating chamber;
    a burner arranged proximate an upper surface of the heating chamber for operatively heating the heating chamber;
    a plurality of elongated heat exchanger tubes disposed in the heating chamber and through which the process medium is flowable for transferring heat to and thereby heating the process medium as it flows through the heat exchanger tubes in the heated heating chamber;
    a substantially rectangularly elongated waste gas duct disposed proximate a floor of the heating chamber, said duct including a top wall, a bottom wall and opposed side walls defining between said top and bottom walls a substantially constant height of the duct along its elongation, and a plurality of openings defined proximate the bottom wall of the waste gas duct at spaced points along its elongation and communicating with the heating chamber for passing into the waste gas duct, through said openings from the heating chamber, waste gas from said burner; and
    a plurality of flow bodies disposed in said waste gas duct, each said flow body being located proximate and associated with at least one of said openings and being spaced from said waste gas duct top wall for operatively equalizing flow of the waste gas in along said waste gas duct for discharge from the said duct.

2. An apparatus in accordance with claim 1 wherein said waste gas duct has an output end through which the waste gas is discharged from the duct and defining a flow direction of the waste gas in said duct toward said output end, each said flow body comprising a surface extending between said opposed sidewalls and along said duct elongation, and said flow bodies being spaced from said duct top wall so as to form a stepped configuration of increasing spacing from said duct top wall in said flow direction of the waste gas.

3. An apparatus in accordance with claim 2, wherein said flow bodies are discrete and unconnected to one another.

4. An apparatus in accordance with claim 2, wherein adjacently-located ones of said flow bodies partially overlap.

5. An apparatus in accordance with claim 2, wherein each of said flow bodies comprises a member defining said flow body surface and having a trailing end remote from said duct output end and a leading end opposite said trailing end, each said flow body further comprising a leg extending between said opposed sidewalls and between said duct bottom wall and said member trailing end.

6. An apparatus in accordance with claim 5, wherein each said member extends substantially parallel to said duct top wall and each said leg extends substantially normal to said duct top wall.

\* \* \* \* \*